United States Patent [19]

Carlson et al.

[11] Patent Number: 4,596,513
[45] Date of Patent: Jun. 24, 1986

[54] HELICOPTER AIR-SPRING VIBRATION ABSORBER

[75] Inventors: Raymond G. Carlson, Orange; Robert A. Stone, Sandy Hook; Leo Kingston, Stratford, all of Conn.

[73] Assignee: United Technologies Corporation, Hartford, Conn.

[21] Appl. No.: 690,331

[22] Filed: Jan. 10, 1985

[51] Int. Cl.⁴ .............................................. B64C 27/51
[52] U.S. Cl. ..................... 416/145; 416/500
[58] Field of Search ............ 416/145, 500; 74/573 F, 74/574

[56] References Cited

U.S. PATENT DOCUMENTS

| | | | |
|---|---|---|---|
| 2,576,105 | 11/1951 | Childs | 416/145 X |
| 3,298,443 | 1/1967 | Burkam et al. | 416/145 X |
| 3,910,720 | 10/1975 | Vincent et al. | 416/145 |
| 4,145,936 | 3/1979 | Vincent et al. | 74/574 |
| 4,212,588 | 7/1980 | Fradenburgh | 416/145 X |
| 4,225,287 | 9/1980 | Vincent et al. | 416/145 |
| 4,255,084 | 3/1981 | Mouille et al. | 416/145 |
| 4,281,967 | 8/1981 | Mouille et al. | 416/145 |

FOREIGN PATENT DOCUMENTS

| | | | |
|---|---|---|---|
| 1010611 | 6/1952 | France | 416/145 |
| 1051106 | 1/1954 | France | 416/145 |
| 1287949 | 2/1962 | France | 416/145 |
| 2014099 | 10/1970 | France | . |
| 1465266 | 4/1974 | United Kingdom | . |
| 2018392 | 10/1979 | United Kingdom | 74/573 F |
| 648865 | 2/1979 | U.S.S.R. | 74/573 F |

OTHER PUBLICATIONS

R. W. White, A Fixed Frequency Rotor Head Vibration Absorber Based Upon G.F.R.P. Springs, Fifth European Rotorcraft and Powered Lift Aircraft Forum, Sep. 4-7th, 1979, Amsterdam, the Netherlands.

Primary Examiner—Everette A. Powell, Jr.
Attorney, Agent, or Firm—Robert P. Sabath

[57] ABSTRACT

A tunable vibration absorber in a helicopter rotor hub arrangement with a central mass suspended in a symmetrical outer casing over the rotor hub, including an air spring for variably stiffly supporting said central mass in three dimensions.

9 Claims, 2 Drawing Figures

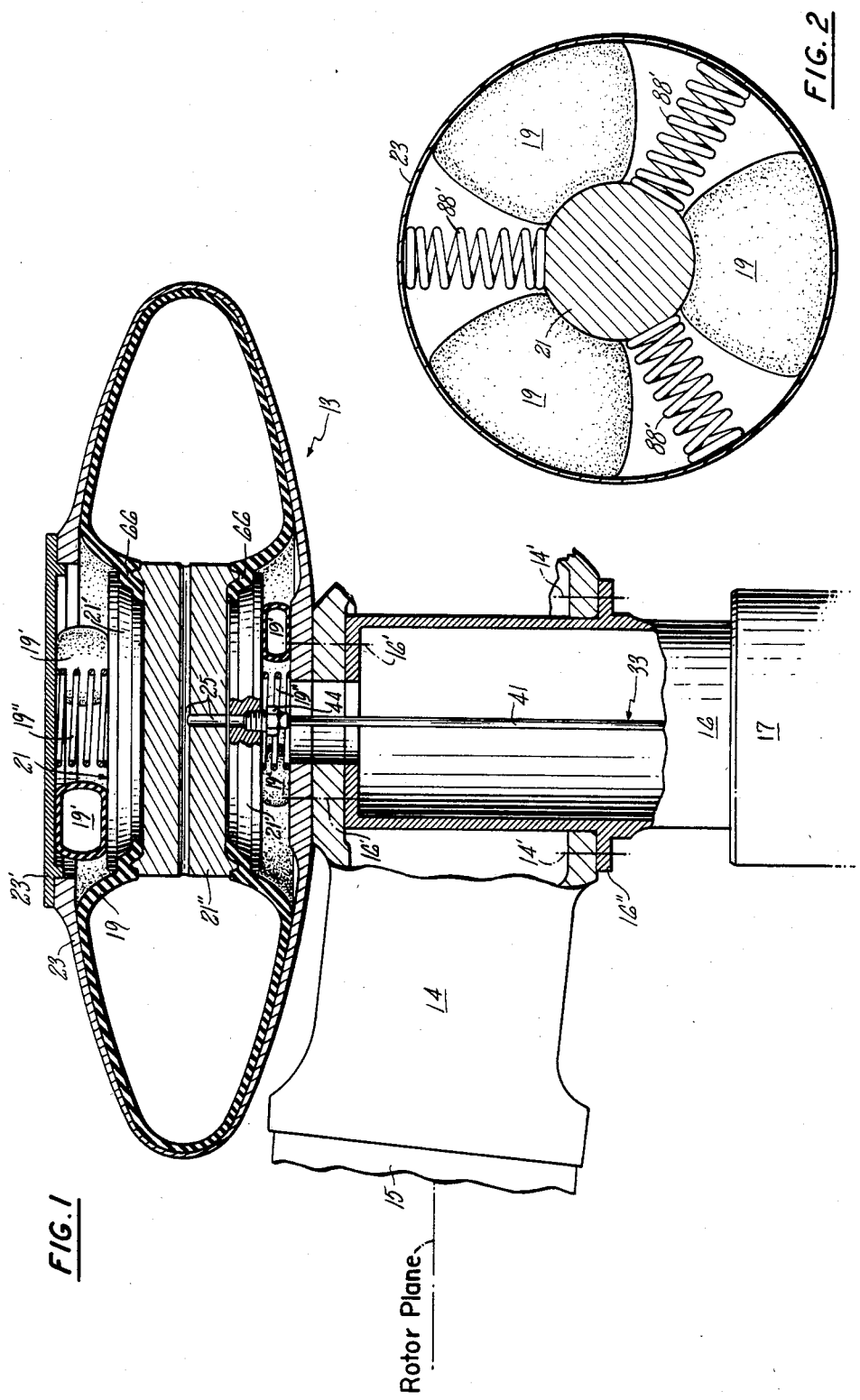

HELICOPTER AIR-SPRING VIBRATION ABSORBER

DESCRIPTION

1. Technical Field

This invention relates to the field of vibration absorbers, and more particularly to the field of vibration absorbers in helicopter rotor hubs.

2. Background Art

As a helicopter rotor hub spins its blades during flight, the air supporting the helicopter imposes a vibratory load on the blades of the main rotor producing forces operating at the blade passage frequency. These forces combine at the rotor hub along three directions of reference, namely the longitudinal direction, which extends generally along the length of the helicopter but in the plane of blade tip rotation; the lateral direction toward the sides of the helicopter in the same plane and perpendicular to the longitudinal direction; and of course the vertical direction.

One type of helicopter vibration absorber arrangement is termed the "monofilar" rotating hub absorber. This absorber compensates effectively for both the "(n−1)/rev "and" (n+1)/rev" in-plane forces. However, this arrangement has not been shown to be effective and workable.

The monofilar absorber concept is designed to react with both of the in-plane forces, but not with forces in the vertical direction. This arrangement is also subject to an undesirable amount of drag as the helicopter advances during flight.

Another type of vibration absorber is called the "bifilar" rotor hub absorber. This kind of absorber uses centrifugal forces to maintain the stiffness required for countering vibrating forces. The "bifilar" type of absorber can be tuned and oriented to react with vertical forces at multiples of blade rotation based upon the number of blades, i.e. n/rev, or with the in-plane forces at either "(n−1)/rev" or "(n+1)/rev" with respect to the rotating reference axes. Both of the latter forces combine to establish "n/rev" lateral and longitudinal forces with respect to fixed reference axes.

The bifilar absorber, however, reacts with only one of the force components referred to above. This kind of absorber arrangement moreover imposes a considerable amount of drag upon the helicopter in flight, because of its shape and size. Further, the arrangement requires the use of a significant amount of non-effective mass. It moreover requires observance of close tolerances during fabrication and nonetheless is subject to undesirable dynamic effects.

There are additional rotor hub absorbers which react with the "n/rev" lateral and longitudinal forces. One of these can be implemented by attaching a mass to the rotor hub. The attached mass is connected to the hub by a set of springs which provide symmetrical stiffness between the hub and the absorber mass in any in-plane, e.g. horizontal, direction.

Even other hub vibration absorbers are limited to reacting with in-plane forces only. Such systems are moreover limited to fixed-frequency non-tunable applications. They accordingly do not change character with rotor speed to maintain resonant vibration absorption at the changing blade passage frequency "n/rev".

Thus, a common disadvantage of all these devices is that they are limited to reacting to only one or two of the reference axis excitation forces, instead of to all three. Thus, a common disadvantage of all these devices is that they are limited to reacting to only one or two of the reference axis excitation forces, instead of to all three.

Further, none of the prior known arrangements is directed toward a variably tunable helicopter rotor hub vibration absorber for helicopter rotor hubs, minimizing the amount of installed mass and effectively reacting with all three reference components of force applied to the rotating helicopter hub.

DISCLOSURE OF INVENTION

According to this invention, a suspended mass helicopter vibration absorber is mounted with respect to the main helicopter rotor hub to absorb the three reference components of force applied respectively along the vertical, lateral and longitudinal directions. The mass is suspended by an air spring of variable selected stiffness arranged to make the arrangement tunably resonant at or near the blade passage frequency. The absorber may include an air and/or mechanical springs for three-dimensional support of the central mass according to one version of the invention.

Thus the net vibratory forces transmitted to the airframe are greatly reduced.

BRIEF DESCRIPTION OF DRAWINGS

FIG. 1 is a vertical cross-section of a preferred embodiment of the invention in which an air and/or mechanical springs serve to tunably absorb vibrations in a helicopter rotor hub arrangement; and FIG. 2 is a horizontal cross-section of another version of the absorber arrangement, this time emphasizing additional mechanical springs effective in the in-plane reference direction.

BEST MODE FOR CARRYING OUT THE INVENTION

FIG. 1 shows a vibration absorber 13 for a helicopter rotor hub 14 supporting helicopter blades 15, said vibration absorber 13 including an air spring 19 such as for example an expandable toroidal rubber bladder and a central mass 21. The hub 14 is supported by mast 16 extending into gear box 17. The air pressure in the spring 19 can be modified to vary stiffness. In lieu of a single toroidal airspring 19, several spaced air spring pouches can be substituted in the circumferential pattern shown. In lieu of air, other compressible, preferably non-volatile fluids or gases can be employed.

The centrally disposed mass 21 can be cylindrical for example, and it bears against the air spring 19. The material of this mass 21 can for example be steel, lead or even tungsten. The air spring 19 is held in a preferably aerodynamic or symmetrical metallic housing 23 which is attached to the rotor hub 14 with bolts for example. The housing 23 acts as a cover or fairing to smooth the flow of air thereover during helicopter flight. The housing 23 includes a removable top 23' to permit access to mass 21. This housing 23 can for example be bolt mounted onto mast 16 along bolt lines 16' with bolts (not shown).

As shown in a preferred embodiment of the invention, a flanged portion 66 of air spring 19 is holdingly inserted between adjacent portions 21' and 21" of mass 21. This permits three-dimensional vibratory absorption as a function of air pressure in spring 19. Air is provided to spring 19 through a duct system 25 defined in mass 21, establishing a variable level of air pressure effectively providing for the required degree of spring stiffness in the air spring 19. Air to the duct system 25 is in turn applied from an air supply controlled by a pressure valve (not shown) through flexible tubing 41 and sealing fitting 44.

Additional air springs 19' can be engaged above and/or below mass 21 to provide additional variable vertical stiffness. The air pressure in these additional air springs 19' can be controlled through additional ducts (not shown) in mass 21 for example. In addition or in lieu thereof, several mechanical springs 88 (centrally positioned ones thereof being shown in FIG. 1 as one example thereof) can be provided to establish a required level of vertical stiffness. Alternatively, several symmetrically spaced vertical springs above and below mass 21 about a vertical axis can be employed.

Additionally, in-plane mechanical springs 88' as suggested in FIG. 2 in conjunction with spaced or segmented pouches of air spring 19 can be employed. By using mechanical springs in conjunction with a tunable air spring 19 a base level of stiffness can be established to permit fine tuning with the air spring 19 thus reducing overall air-supply volume requirements.

The air pressure in springs 19 and/or 19' is variable to enable tuning changes according to rotor speed directly, or according to more complex known vibration monitoring feedback systems (not shown), to vary pressure and thus control aircraft vibration as rotor speed and flight conditions change.

The information above may lead others to conceive of variations of the invention, which nonetheless fall within the scope thereof. Accordingly, attention is directed to the claims which follow, as these define with particularity the metes and bounds of the invention.

I claim:

1. A tunable vibration absorber for a helicopter rotor hub comprising outer casing means for containing an absorber assembly, spring means for holding a central mass, and a central mass suspended in said outer casing means which in turn is mounted fixedly with respect to said rotor hub, said absorber characterized by said spring means three-dimensionally holding said central mass in suspension.

2. The absorber of claim 1, further characterized in that said central mass defines a fluid duct for variably supplying fluid pressure to said spring means.

3. The absorber of claim 2, further characterized in that said fluid duct means is connected to a source of pressurized air.

4. The absorber of claim 1, further characterized in that said spring means provides a variable degree of stiffness in supporting said central mass.

5. The absorber of claim 1, further characterized in that said spring means is flangedly connected to said central mass.

6. The absorber of claim 1, further characterized in that said spring is segmentedly disposed about said central mass.

7. The absorber of claim 1, further characterized in that said central mass is additionally mechanically spring-suspended.

8. The absorber of claim 7, further characterized in that the suspension of said central mass is accomplished jointly by mechanical and air spring means.

9. The absorber of claim 1, wherein said outer casing is characterized by an aerodynamic form, whereby airdrag during helicopter flight is reduced.

* * * * *